(12) United States Patent
Pellerin et al.

(10) Patent No.: US 9,266,408 B2
(45) Date of Patent: Feb. 23, 2016

(54) WINDSHIELD MOUNTING SYSTEM AND METHOD OF USING THE SAME

(71) Applicant: Soucy International Inc., Drummondville (CA)

(72) Inventors: Michel Pellerin, Drummondville (CA); Guillaume Provencher, St-Germain-de-Grantham (CA); Denis Archambault, Drummondville (CA); Vincent Morin, Saint-Hyacinthe (CA)

(73) Assignee: Soucy International Inc., Sherbrooke, QC (CA)

( * ) Notice: Subject to any disclaimer, the term of this patent is extended or adjusted under 35 U.S.C. 154(b) by 156 days.

(21) Appl. No.: 14/043,984

(22) Filed: Oct. 2, 2013

(65) Prior Publication Data

US 2014/0159415 A1    Jun. 12, 2014

Related U.S. Application Data

(60) Provisional application No. 61/708,800, filed on Oct. 2, 2012.

(51) Int. Cl.
*B62J 17/02* (2006.01)
*B60J 1/00* (2006.01)
*B62J 17/04* (2006.01)

(52) U.S. Cl.
CPC *B60J 1/007* (2013.01); *B62J 17/04* (2013.01); *Y10T 29/49947* (2015.01)

(58) Field of Classification Search
CPC ........................................................ B62J 17/04
USPC .......................... 296/78.1, 77.1, 96.21, 96.11
See application file for complete search history.

(56) References Cited

U.S. PATENT DOCUMENTS

| 5,732,965 | A  | * | 3/1998  | Willey        | 280/288.4 |
|-----------|----|---|---------|---------------|-----------|
| 6,234,554 | B1 | * | 5/2001  | Willey        | 296/78.1  |
| 6,254,166 | B1 | * | 7/2001  | Willey        | 296/78.1  |
| 6,736,441 | B1 | * | 5/2004  | Barber et al. | 296/96.21 |
| 7,401,953 | B2 | * | 7/2008  | Isayama       | 362/474   |
| 7,607,712 | B2 | * | 10/2009 | Suita et al.  | 296/78.1  |
| 7,946,632 | B1 | * | 5/2011  | Mueller       | 292/1     |
| 2006/0087143 | A1 | * | 4/2006 | Willey     | 296/78.1  |
| 2006/0232091 | A1 | * | 10/2006 | Fox et al. | 296/78.1  |
| 2007/0013164 | A1 | * | 1/2007  | Massepp    | 280/288.4 |
| 2013/0015676 | A1 | * | 1/2013  | Coulombe et al. | 296/78.1 |
| 2014/0348581 | A1 | * | 11/2014 | Boutin et al. | 403/376 |

FOREIGN PATENT DOCUMENTS

GB            702830  A  *  1/1954

* cited by examiner

*Primary Examiner* — Hilary Gutman
(74) *Attorney, Agent, or Firm* — Robert Brouillette; Brouillette & Partners

(57) ABSTRACT

A system for mounting a windshield to a small vehicle such as an all-terrain vehicle ("ATV"), a utility-terrain vehicle ("UTV"), or a snowmobile comprising a pair of receiving members configured to be mounted to, or integrated with, the vehicle and a corresponding pair of mounting members mounted to, or integrated with, the windshield panel or panel assembly. The receiving member may be integrated to the lighting pod of the vehicle. The mounting members of the system are configured to be respectively releasably received into the receiving members. Each receiving member comprises a receiving cavity and at least one locking opening, and each mounting member comprises at least one resilient locking arm configured to releasably engage the at least one locking opening such that the mounting members can respectively engage the receiving members in a releasable locking engagement.

28 Claims, 14 Drawing Sheets

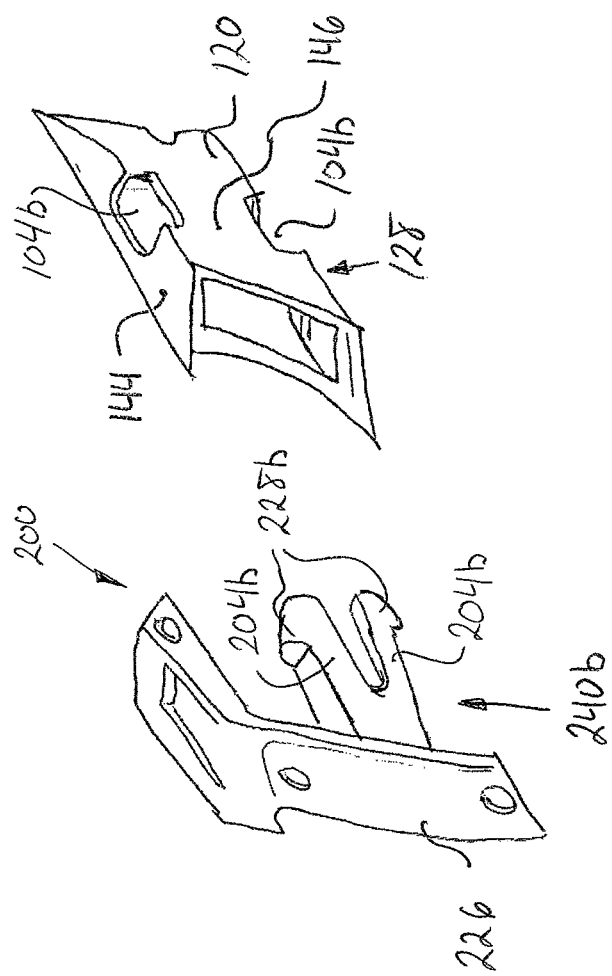

WINDSHIELD MOUNTING SYSTEM AND METHOD OF USING THE SAME

CROSS-REFERENCE TO RELATED APPLICATIONS

The present patent application claims the benefits of priority of U.S. Provisional Patent Application No. 61/708,800, entitled "Windshield Mounting System and Method of Using the Same", and filed at the United States Patent and Trademark Office on Oct. 2, 2012, the content of which is incorporated herein by reference.

FIELD OF THE INVENTION

The present invention generally relates to mounting systems and support assemblies for securing a windshield to a vehicle. More particularly, the present invention relates to quick-release windshield mounting systems and support assemblies for small vehicles such as, but not limited to, all-terrain vehicles ("ATVs"), utility-terrain vehicles ("UTVs"), snowmobiles, and other similar vehicles.

BACKGROUND OF THE INVENTION

Nowadays, there is an ever-increasing number of people which enjoy riding all-terrain vehicles and other similar off-road vehicles, either in trails specifically designed for this activity or even on totally uncharted terrains.

In order to adapt the vehicles to the increasing variety of terrains over which they are operated, companies have long been offering after-market accessories such as support racks, supplementary seats, trailer hitches, track systems, and so on.

Since these vehicles are generally subjected to shocks and vibrations, it is important that the accessories mounted to the vehicles be relatively fixedly mounted in order to prevent accidental failure or removal during use.

In the particular case of windshields, this is of utmost importance since the windshield generally protects the operator of the vehicle. Nevertheless, on some occasions, it is practical to be able to remove the windshield, at least temporarily, in order to avoid damage or for space considerations. For example, when there are low branches partially blocking a trail or when the vehicle must be stored or loaded onto a trailer for transport.

Several windshield mounting systems have thus been proposed. However, most mounting systems require the use of tools to install and to remove the windshield panel. With these windshield mounting systems, the process of installing or removing the windshield panel can be long and even impossible when the required tools are not available.

More recently, in order to mitigate the aforementioned shortcomings, some quick-release windshield mounting systems have been proposed, allowing the quick installation and removal of windshields without the use of tools. Examples of such quick-release windshield mounting systems can be seen in U.S. Pat. Nos. 7,044,530; 7,360,819; and 7,543,879.

In spite of the availability of many quick-release windshield mounting systems, one shortcoming has been the attachment points of these quick-release systems. Indeed, the most common and universal attachment point of most quick-release windshield mounting systems is the handlebar of the vehicle. However, handlebars are usually very busy with other accessories (e.g. hand guards, winch switch, heated handles/seats controls, etc.).

Hence, despite ongoing developments in the field of windshield mounting systems and more particularly in the field of quick-release windshield mounting systems, there is still a need for an improved mounting system which would allow quick and easy installation and removal of a windshield onto a small vehicle without the need for tools while at least mitigating some of the shortcomings of the prior art.

SUMMARY OF THE INVENTION

A quick-release windshield mounting system in accordance with the principles of the present invention allows a windshield panel to be mounted to, and removed from, a vehicle without the need for tools.

As used hereinabove and hereinafter, the term windshield panel must be construed broadly such as to encompass, in addition to regular windshield panel, windshield, windshield assembly, any other similar apparatuses or assemblies.

Hence, a windshield mounting system in accordance with the principles of the present invention generally comprises at least one receiving member generally configured to be located on the front portion of the vehicle, and at least one mounting member mounted to, or integral with, the windshield panel, and configured to be releasably coupled to the receiving member.

The receiving member generally comprises an internal receiving cavity extending into the receiving member and having a receiving opening. The receiving member also generally comprises at least one locking opening (e.g. a slot) generally located at a distance from the receiving opening. The receiving cavity is generally configured to receive therein the mounting member, or at least a portion thereof.

In that sense, the mounting member generally comprises at least one resilient locking arm comprising a locking projection or tab protruding therefrom. The locking projection is generally suitably sized and shaped to be properly received into the locking opening. The locking projection is also typically located at the free extremity of the locking arm.

The resilient locking arm is configured to releasably engage the locking opening via the locking projection. In that sense, by virtue of its resiliency, the locking arm is configured to be resiliently deflected during its insertion into the receiving cavity, and then to return to its normal non-deflected position once the locking projection reaches and extends into the locking opening in a locking engagement.

Understandably, to remove the windshield panel, the operator of the vehicle only needs to push the locking projection out of the locking opening and then pull the windshield panel, and thus the mounting member, out of the receiving member. Hence, by simply manually actuating the locking arm, the windshield panel can easily be installed on, or removed from, the vehicle, without the need for tools.

In typical yet non-limitative embodiments, the windshield mounting system comprises a pair of receiving members and a corresponding pair of mounting members.

In typical yet non-limitative embodiments, the receiving member (or members) is configured to be located on the lighting pod located at the front of the vehicle. In such embodiments, the receiving member (or members) can be mounted to the lighting pod or be made integral therewith.

In some non-limitative embodiments, the mounting member also comprises at least one support or guide arm configured to be received into the receiving cavity. In such embodiments, the at least one locking arm and the at least one guide arm are typically spaced apart.

In some non-limitative embodiments, the mounting member comprises two resilient locking arms, each comprising a locking projection, and the receiving member correspondingly comprises two locking openings. In such embodiments, the locking openings are typically, but not necessarily, located on opposite sides or wall portions of the receiving member such that the two locking projections can be depressed, during the removal procedure, by opposing fingers (e.g. thumb and index) of the operator.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 14 is a front perspective view of another embodiment of a windshield mounting system in accordance with the principles of the present invention.

DETAILED DESCRIPTION OF THE PREFERRED EMBODIMENT

A novel windshield mounting system and method of using the same will be described hereinafter. Although the invention is described in terms of specific illustrative embodiments, it is to be understood that the embodiments described herein are by way of example only and that the scope of the invention is not intended to be limited thereby.

Figure 1:
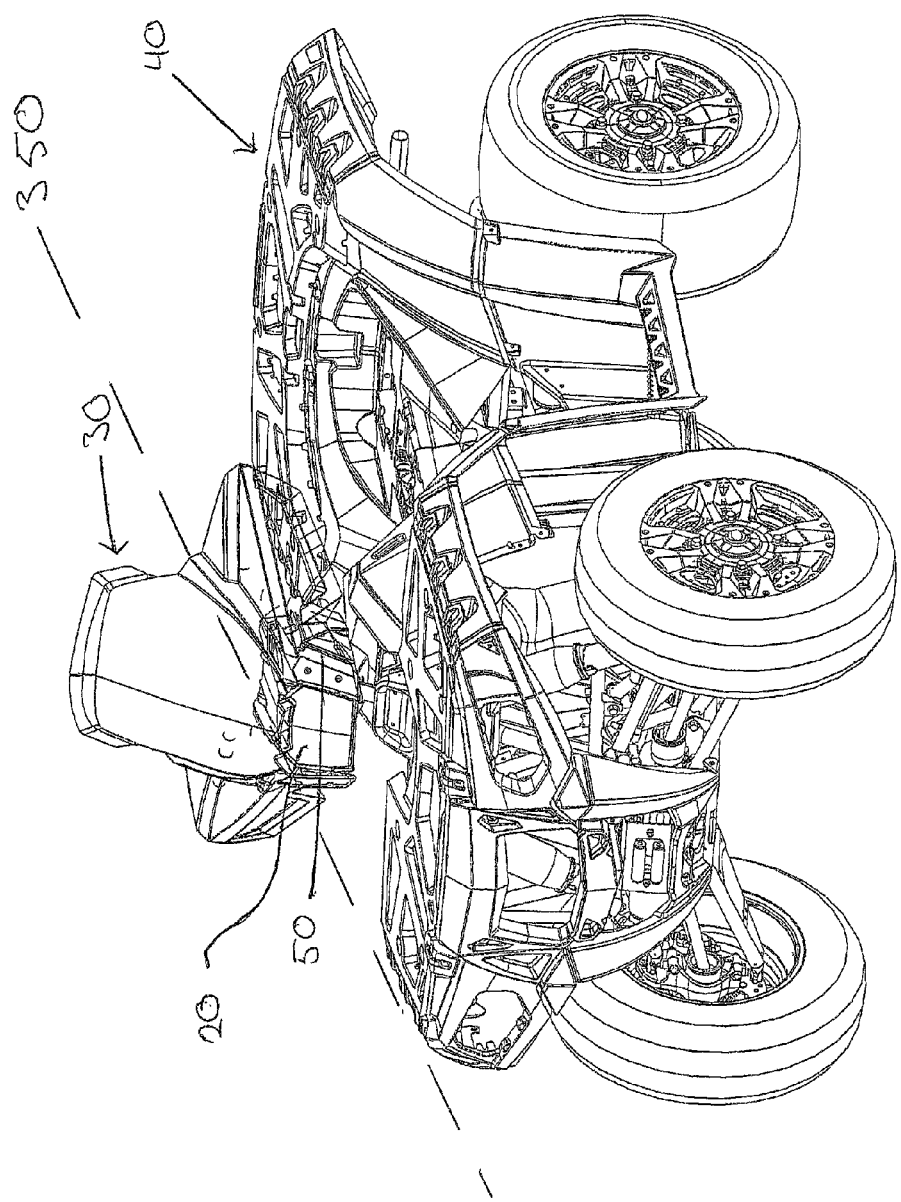
FIG. 1 is a front perspective view of an exemplary all-terrain vehicle (ATV) equipped with a windshield panel mounted thereto via an embodiment of a windshield mounting system in accordance with the principles of the present invention.

Referring first to FIG. 1, an all-terrain vehicle (ATV) 40 equipped with a windshield panel 30 is shown. The windshield panel 30 is mounted to the ATV 40 via an embodiment of a windshield mounting system 50 in accordance with the principles of the present invention. As it is be best understood below, the windshield mounting system 50 allows the rapid installation and removal of the windshield panel 30 to and from the vehicle 40.

Understandably, though a windshield mounting system 50 is shown being used on an ATV, the windshield mounting system 50 could be used on other small vehicles such as, but not limited to, utility-terrain vehicles, snowmobiles, etc.

Figure 2:
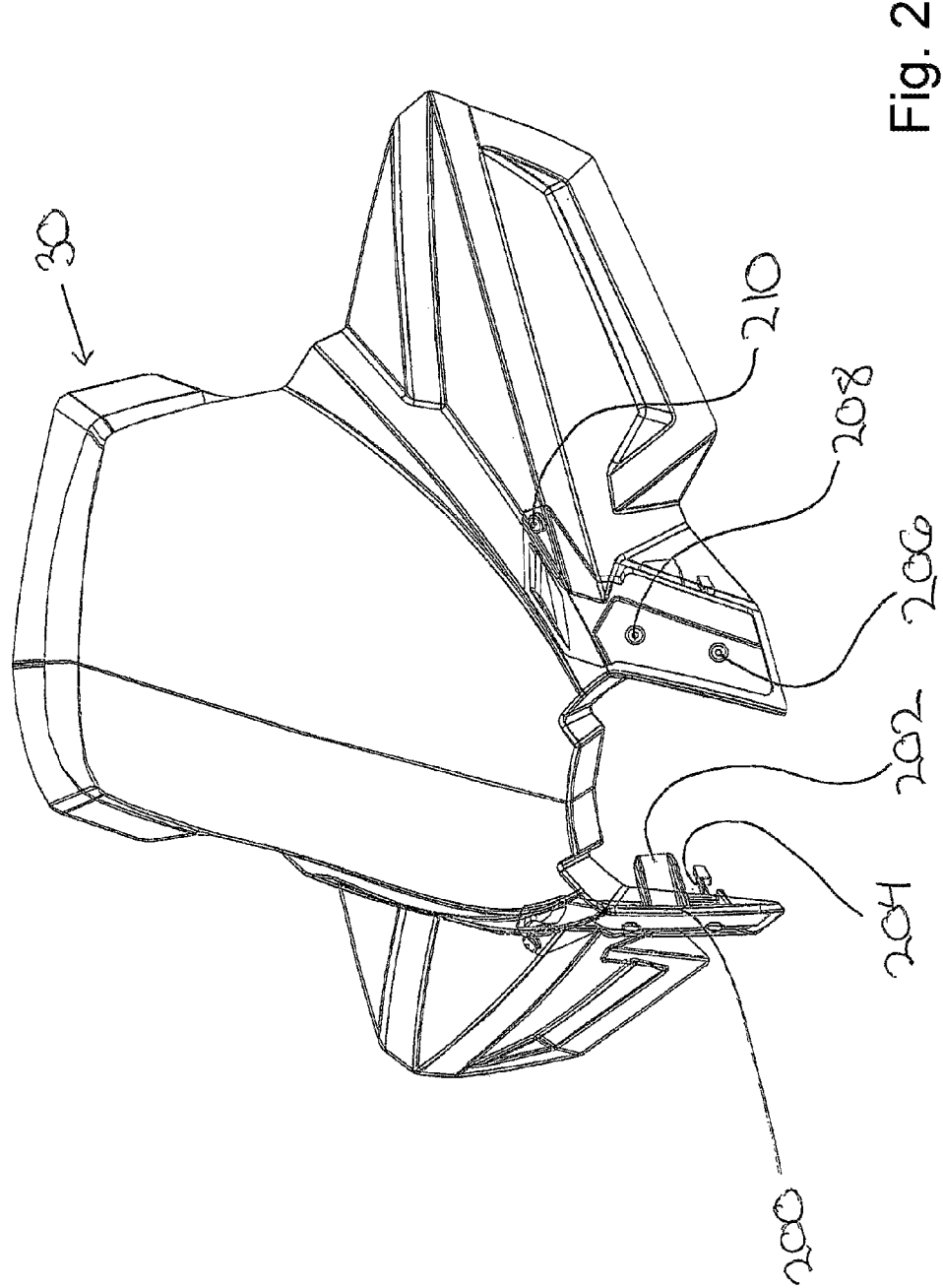
FIG. 2 is a front perspective view of the windshield panel of FIG. 1 comprising the mounting members of the windshield mounting system.
Figure 3:
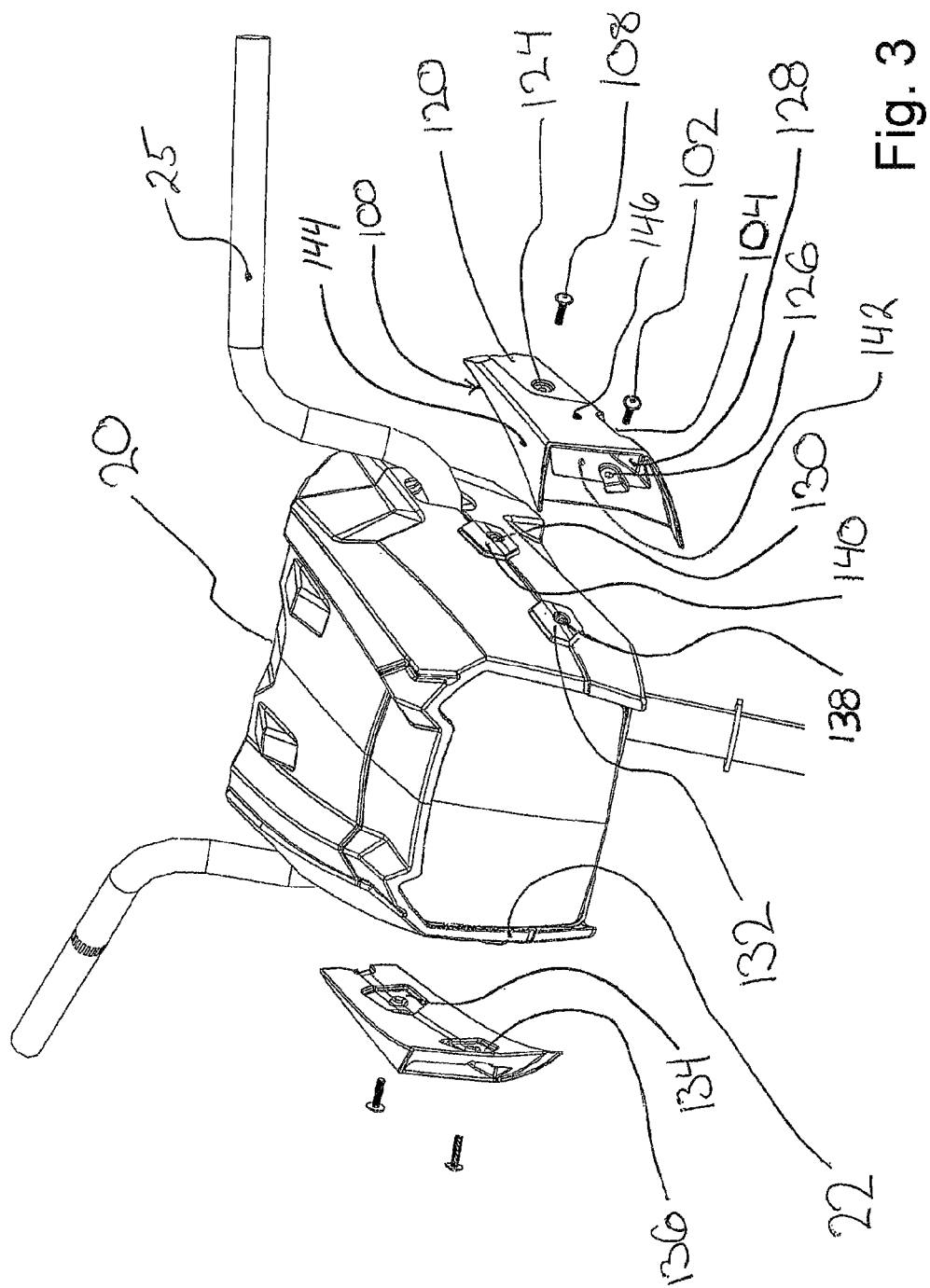
FIG. 3 is a front perspective of the lighting pod region of the ATV of FIG. 1, with the receiving members of the windshield mounting system shown exploded from the lighting pod.
Figure 4:
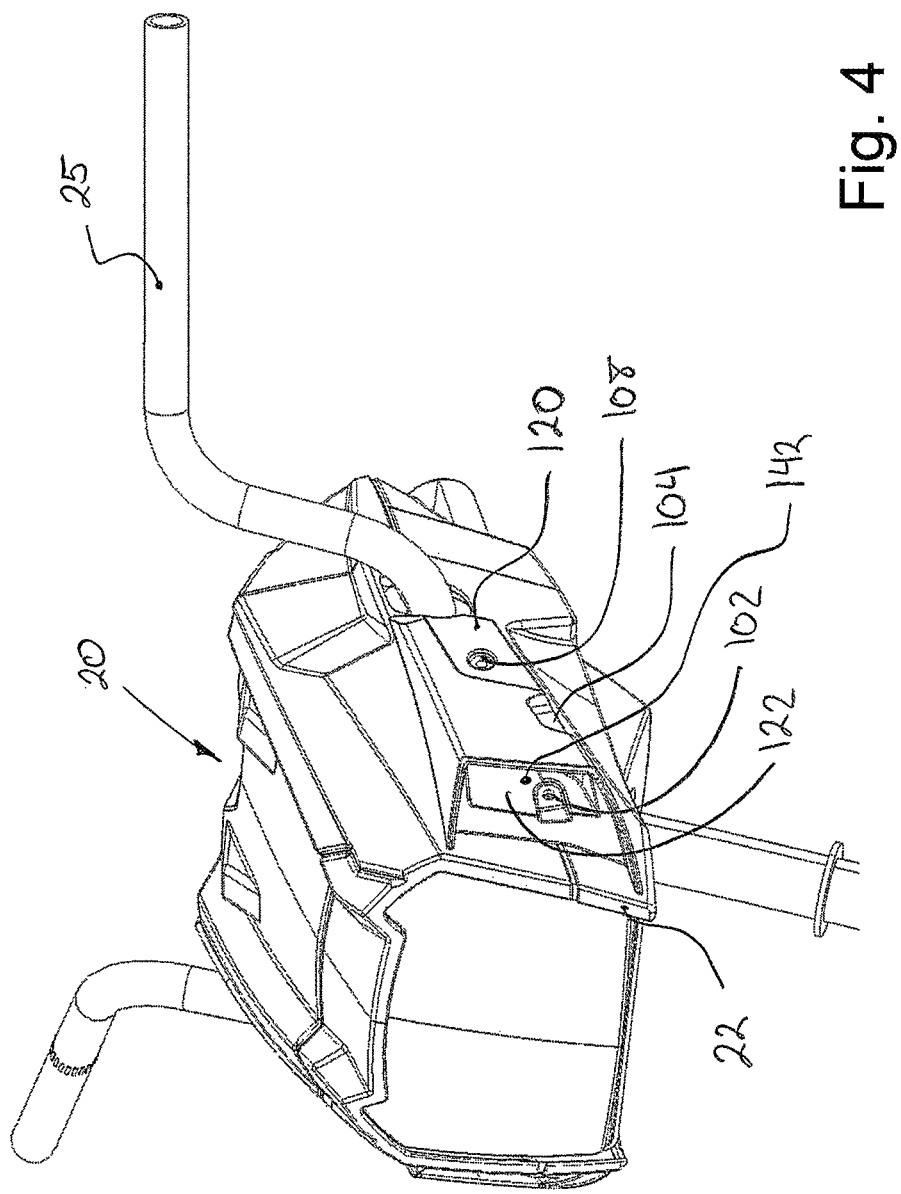
FIG. 4 is a front perspective of the lighting pod region of the ATV of FIG. 1, with the receiving members of the windshield mounting system shown mounted to the lighting pod.

Referring now to FIGS. 2 to 4, in the present embodiment, the windshield mounting system 50 typically comprises a pair of receiving members 100 and a corresponding pair of mounting members 200. As it will be explained in more details below, the mounting members 200 are configured to be respectively releasably received in the receiving members 100.

The receiving members 100 are generally configured to be located at the front or forward portion of the vehicle 40. In the present embodiment, the receiving members 100 are mounted on the lighting pod 20 of the ATV 40. In other embodiments, the receiving members 100 could be made integral with the lighting pod 20.

Notably, when the receiving members 100 are mounted to, or integral with, the lighting pod 20 of the vehicle 40, the receiving members 100 do not use space on the handlebar 25 of the vehicle 40, thereby leaving space for other accessories to be mounted to the handlebar 25.

For their parts, the mounting members 200 are typically configured to be mounted to, or integral with, the windshield panel 30. Understandably, the windshield panel 30 itself could be unitary (e.g. a single piece of molded polymer) or be made from a plurality of components (e.g. a windshield panel mounted to a support frame). As such, the mounting members 200 could be integrated into the windshield panel 30, in which case the windshield panel 30 and its mounting members 200 could also be a unitary structure.

Due to the inherent substantial symmetry of the vehicle 40 and of the windshield panel 30 with respect to a longitudinal axis 350 of the vehicle 40, the left and right receiving members 100 and the left and right mounting members 200 are substantially symmetrical in nature.

With reference to FIGS. 2 to 4, the receiving members 100 and the mounting members 200 will be described in more details.

Referring to FIGS. 3 and 4, the receiving member 100 generally comprises a main portion 120 defining an internal receiving cavity 122 extending into the main portion 120. The main portion 120 also comprises a receiving opening 142. The main portion 120 further comprises at least one locking opening or slot 104. In the present embodiment, the locking opening 104 is located in the lower wall portion 128 of the main portion 120 in order to provide the user with an easy and comfortable way of removing the windshield panel 30 as it will be best understood below. Understandably, in other embodiments, the location of the locking opening 104 could be different. For instance, in other embodiments, the locking opening 104 could be located on the upper wall portion 144 or on the exterior wall portion 146.

In the present embodiment, the receiving member 100 is substantially made of polymeric material (e.g. plastic). However, in other embodiments, the receiving member 100 could be made of other materials.

Referring particularly to FIG. 4, in the present embodiment, the receiving cavity 122 is generally horizontally oriented with the receiving opening 142 facing in the forward direction of the vehicle 40. This configuration allows for the insertion of the arms 202 and 204 of the connecting portion 240, described below, with more ease. Moreover, this orientation will ensure that aerodynamic forces, generated by the forward movements of the vehicle 40, will strengthen the mounting of the windshield panel 30 by further pushing the mounting members 200 into the receiving members 100.

In the present embodiment, the main portion 120 comprises two fastener openings 124 and 126 allowing for the securing of the receiving member 100 to the vehicle 40, typically to the lighting pod 20, with fasteners 102 and 108 (e.g. screws).

In the present embodiment, the main portion 120 is configured to mate with the lighting pod 20 of the vehicle 40. In that sense, the main portion 120 is directly mounted onto the lighting pod outer shell 22 using properly sized fasteners 102 and 108. In the present embodiment, the receiving element 100 is generally designed to substantially fit the shape and configuration of the lighting pod 20. As such, in the present embodiment, the receiving element 100 has been configured with some recesses 134 and 136 configured to mate with protrusions 132 and 140 provided on the lighting pod 20. Still, as mentioned above, in other embodiments, the receiving members 100 could be made integral with the lighting pod 20.

Still referring to FIGS. 3 and 4, the receiving cavity 122 is elongated and substantially of rectangular shape. The cavity 122 is configured in such a way as to allow the corresponding arms 202 and 204 of the mounting member 200 (see FIG. 5) to be properly received therein. In that sense, the first opening 126 is counterbored in a way preventing the head of the fastener 102 to extend in the cavity 122. Similarly, the second opening 124 is also preferably counterbored to allow for the complete embedding of the fastener 108.

The receiving member 100 is also preferably configured to have the fasteners fit the openings 130 and 138 already located in the shell 22 of the lighting pod 20. As such, it is possible to simply substitute the fasteners provided on the vehicle 40 with the new fasteners 102 and 108 typically configured for the windshield mounting system receiving member 100.

Now referring to FIGS. 2 and 5, the mounting member 200 will be described.

The mounting member 200 typically comprises an attachment base portion 226 configured to be fixedly mounted to, or integral with, the windshield panel 30, and a connecting portion 240 extending from the base portion 226. In the present embodiment, the connecting portion 240 comprises a support portion 224 from which arms 202 and 204 extend.

In the present embodiment, the mounting member 200 is also substantially made of polymeric material (e.g. plastic). In other embodiments, the mounting member 200 could be made of other materials. Still, as it will be better understood below, the locking arm(s) of the mounting member 200 generally need(s) to be made of resilient materials.

Figure 5:
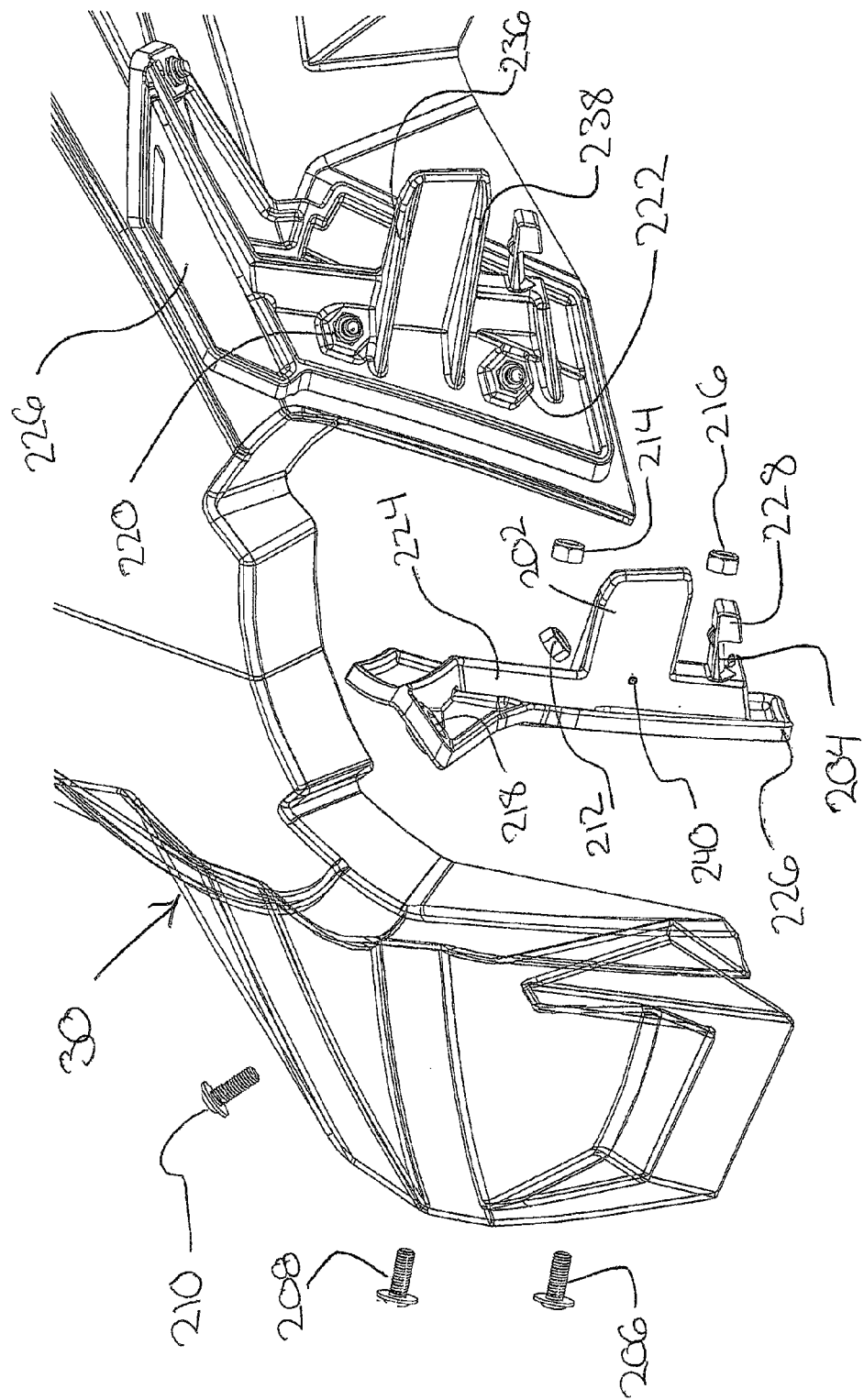
FIG. 5 is a rear perspective and partially exploded view of the windshield panel and mounting members of FIG. 2.

Still referring to FIG. 5, in the present embodiment, the mounting member 200 is mounted to the windshield panel 30. In that sense, in the present embodiment, the base portion 226 is substantially L-shaped such as to provide a proper fit with the windshield panel 30. Also, in the present embodiment, the base portion 226 comprises three substantially similar openings, 218, 220 and 222 allowing for the fastening of the base portion 226 to the windshield panel 30 via fasteners such as bolt and nut assemblies 206 and 216, 208 and 214, and 210 and 212. Understandably, the configuration of the attachment portion 226 could be different to accommodate other types or configurations of windshield panels or assemblies 30.

Figure 6:
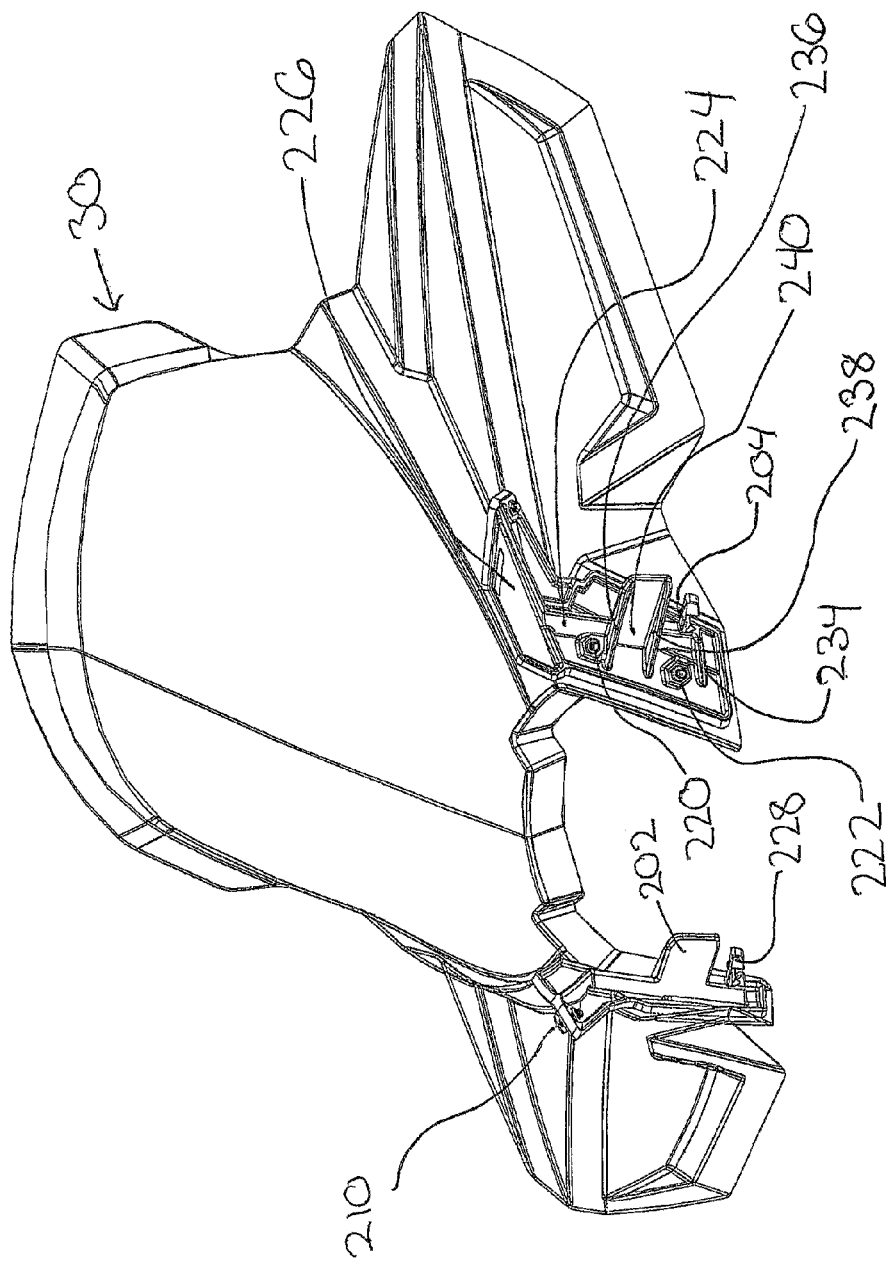
FIG. 6 is a rear perspective view of the windshield panel and mounting members of FIG. 2.

Referring now to FIGS. 5 and 6, in the present embodiment, the arms 202 and 204 of the connecting portion 240, which extend from the base portion 226, are configured to be received into the receiving cavity 122 of the receiving member 100. In the present embodiment, arm 202 is a support or guide arm 202 while arm 204 is a resilient locking arm 204. In that sense, the locking arm 204 comprises at least one locking protuberance or projection 228 positioned along it.

In the present embodiment, the guide arm 202 is generally substantially larger than the locking arm 204. For its part, the resilient locking arm 204 is configured to releasably engage the locking opening 104 via the locking projection 228. As such, the locking arm 204 is configured to be resiliently deflected during the insertion of the mounting member 200, and more particularly of the connecting portion 240 thereof, into the receiving cavity 122, and then to return to its normal non-deflected position once the locking projection 228 reaches and extends into the locking slot 104 in a locking engagement. In that sense, the two arms 202 and 204 are generally separated or spaced by at least the width of the locking projection 228 to allow for the proper deflection of the locking arm 204 upon insertion of the mounting member 200 into the receiving member 100.

In the present embodiment, the support portion 224 and the guide arm 202 are typically reinforced by ribs 234, 236 and 238 to allow for a more stable mounting of the windshield panel 30 to the lighting pod 20 of the vehicle 40.

Figure 7:
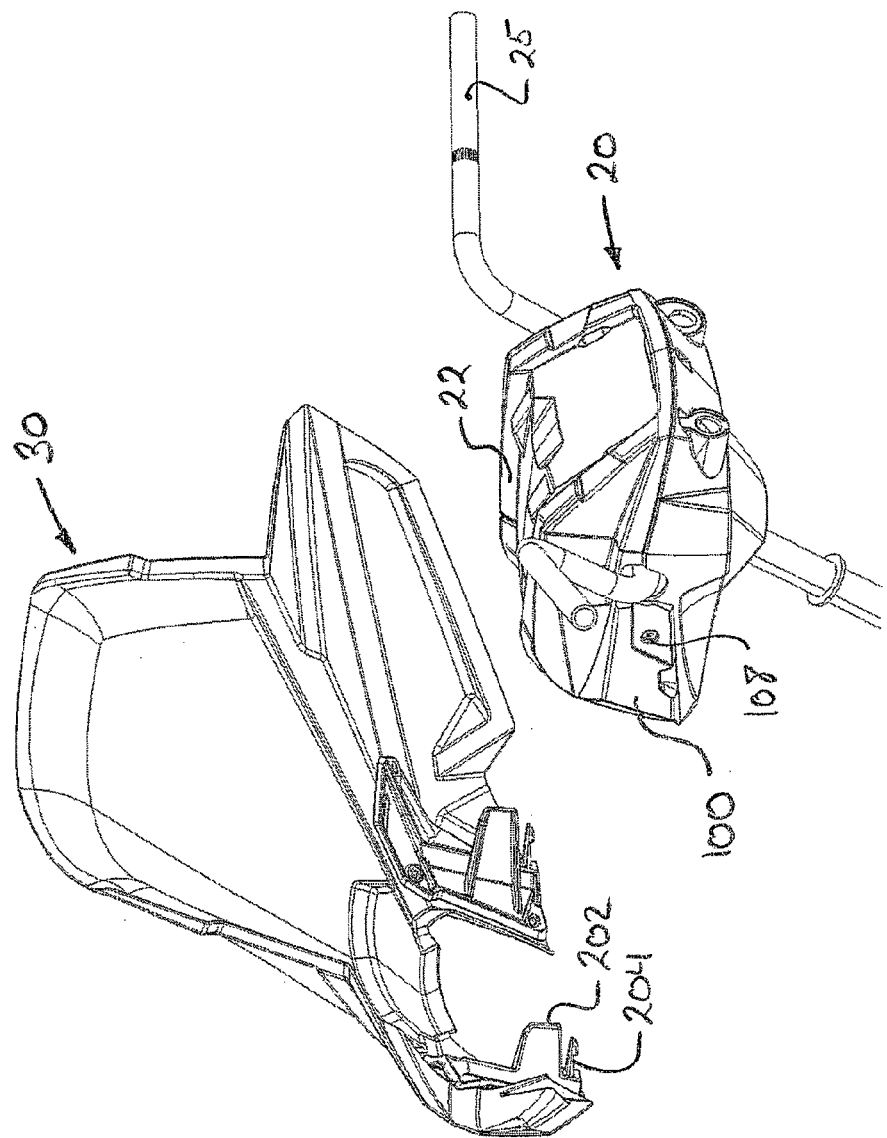
FIG. 7 is a rear perspective view of the windshield panel and of the lighting pod respectively equipped with the mounting members and receiving members of the windshield mounting system.

Referring to FIG. 7, in the present embodiment, the windshield panel 30 fitted with the pair of mounting members 200 and the lighting pod 20 fitted with the pair of receiving members 100 are shown. The fixation of the mounting members 200 on the windshield panel 30 and of the receiving members 100 on the vehicle 40 occurs only once during the initial installation. Upon the completion of the initial installation of the mounting and receiving members 200 and 100, the system 50 allows for quick installation, and removal, of the windshield panel 30 to and from the vehicle 40.

Figure 8:
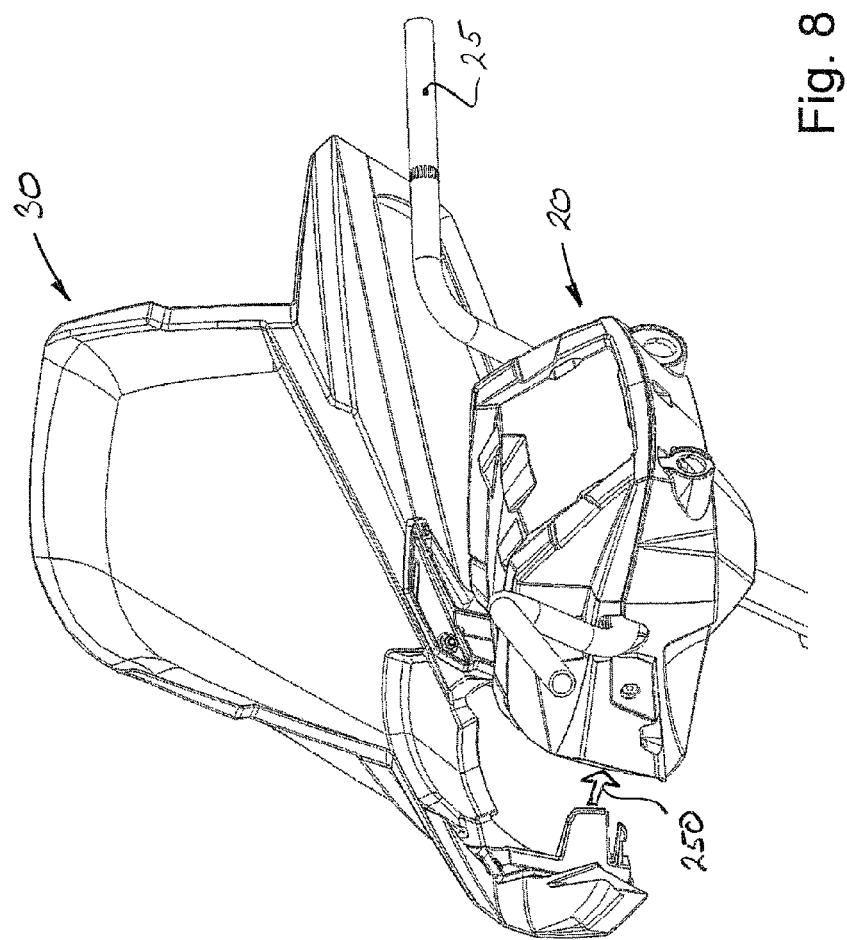
FIG. 8 is a rear perspective view of the windshield panel and of the lighting pod respectively equipped with the mounting members and receiving members of the windshield mounting system during the installation of the windshield panel.
Figure 9:
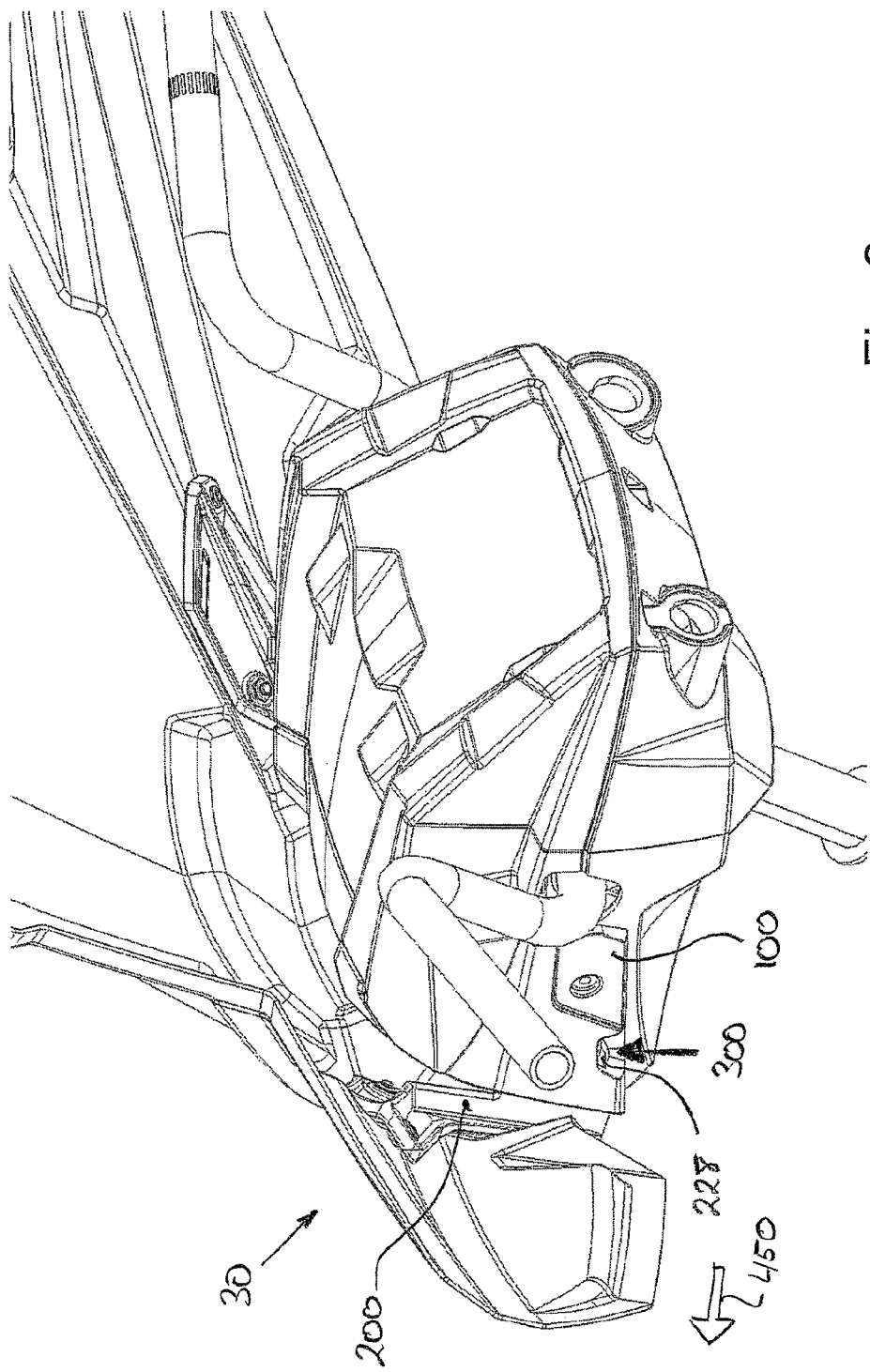
FIG. 9 is a rear perspective view of the windshield panel mounted to the lighting pod.

From the foregoing description, and with reference to FIGS. 7 to 9, the general method for installing the windshield panel 30 equipped with the mounting members 200 of the windshield mounting system 50 will be apparent. The installation begins with aligning the guiding arms 202 and the locking arms 204 of the mounting members 200 on either side of the windshield panel 30, with the receiving openings 142 of the cavities 122 of the receiving members 100 as can be seen in FIG. 8. Then, referring to FIG. 9, the windshield panel 30 is moved toward the lighting pod 20 while inserting the guiding and locking arms 202 and 204 of the right and left mounting members 200 in the respective right and left cavities 122 of the right and left receiving members 100 until the locking projection 228 on the locking arms 204 engage the locking openings 104 and are properly securing the windshield panel 30.

Figure 10:
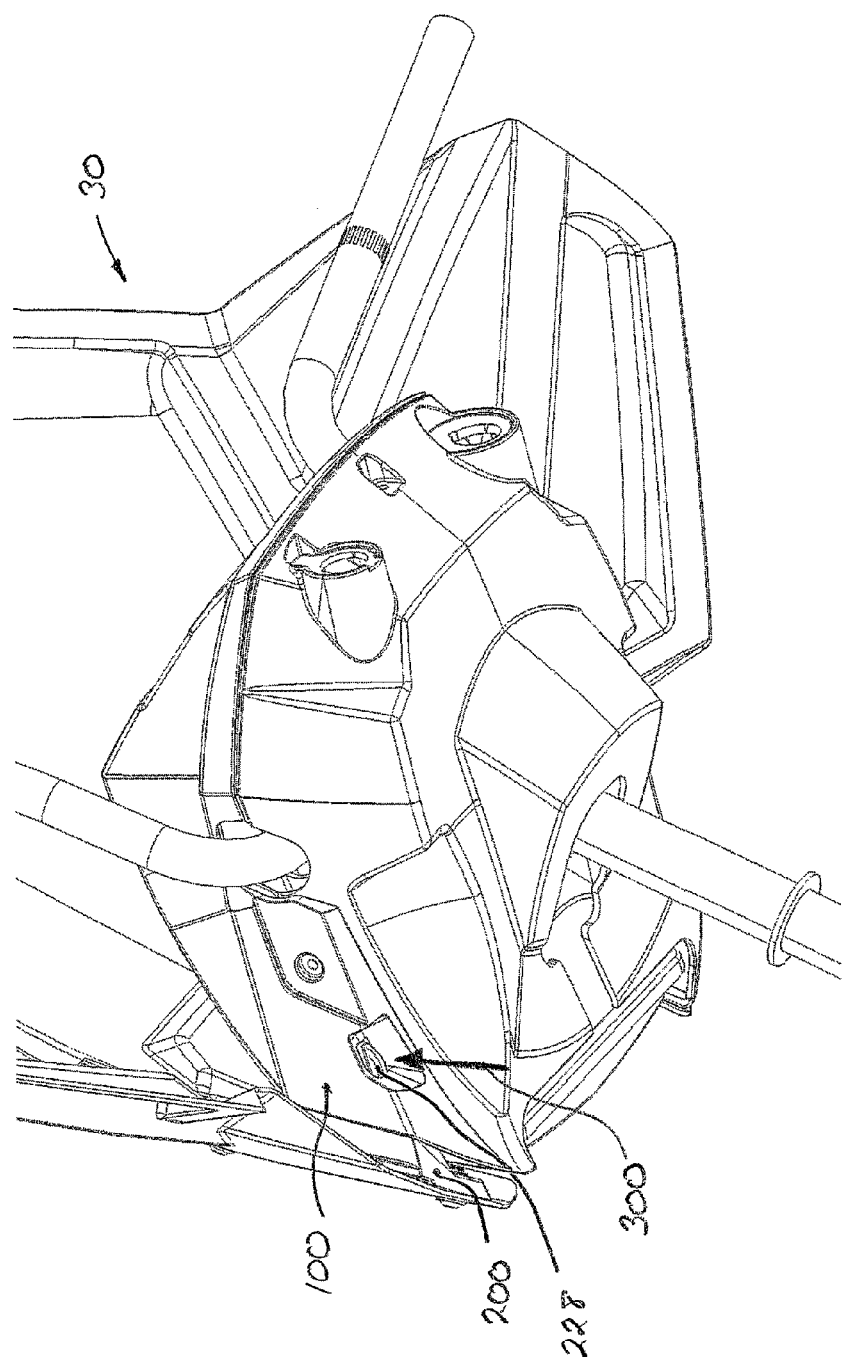
FIG. 10 is bottom rear perspective view of the windshield panel and lighting pod of FIG. 9 showing the release mechanism of the windshield mounting system.

From the foregoing description, and with reference to FIGS. 9 and 10, the general method for releasing the locking projections 228 from the locking openings 104 for removal of the mounting members 200 and the windshield panel 30 from the receiving members 100 will become apparent. As illustrated by the arrow 300, upward pressure applied with the fingers of the operator upon the resilient locking arms 204, and more particularly upon the locking projections 228, results in the locking arm 204 moving or being deflected inwardly toward the guiding arms 202 and liberating the way for the release of the mounting members 200 from the receiving cavities 122. Once the locking projections 228 are pushed out of the locking openings 104, the mounting members 200, and thus the windshield panel 30, may be readily removed from the receiving members 100 by sliding them in the direction generally indicated by arrow 450.

The windshield mounting system 50 in accordance with the principles of the present invention therefore allows the operator of a vehicle 40 to quickly install, and remove, a windshield panel 30 on his or her vehicle 40 without the need for tools.

Understandably, the windshield mounting system 50 could also be designed in a reverse way where the mounting members 200 would be configured to be mounted to, or integral with, the lighting pod 20 of the vehicle 40, and where the receiving elements 100 would be mounted to, or integral with, the windshield panel 30.

Notably, though in the present embodiment, the connecting portion 240 of the mounting member 200 comprises only one locking arm 204, in other embodiments, the connecting portion 240 could comprises two (or more) locking arms. Such an embodiment is depicted in FIG. 14. In this embodiment, each of the locking arms 204b comprises a locking projection 228b. Understandably, the receiving member 100 correspondingly comprises two locking openings 104b. In that sense, in embodiments comprising two locking arms 204b and two locking openings 104b, the locking openings 104b could advantageously be located on opposite wall portions (e.g. wall portions 128 and 144) of the receiving member 100 such that the operator could depress the locking arms 204b using opposing fingers (e.g. thumb and index).

Figure 11:
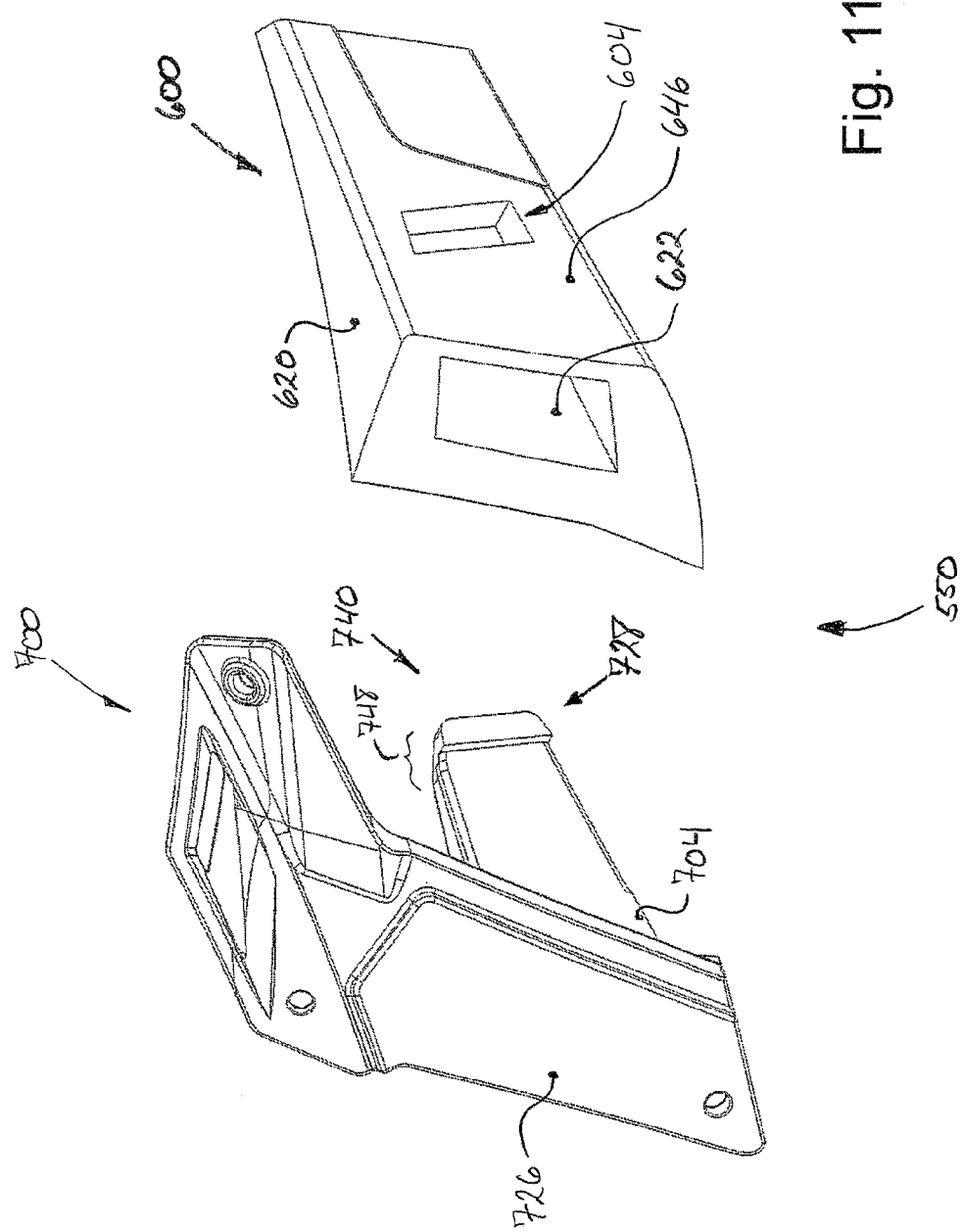
FIG. 11 is a front perspective view of another embodiment of a windshield mounting system in accordance with the principles of the present invention.
Figure 12:
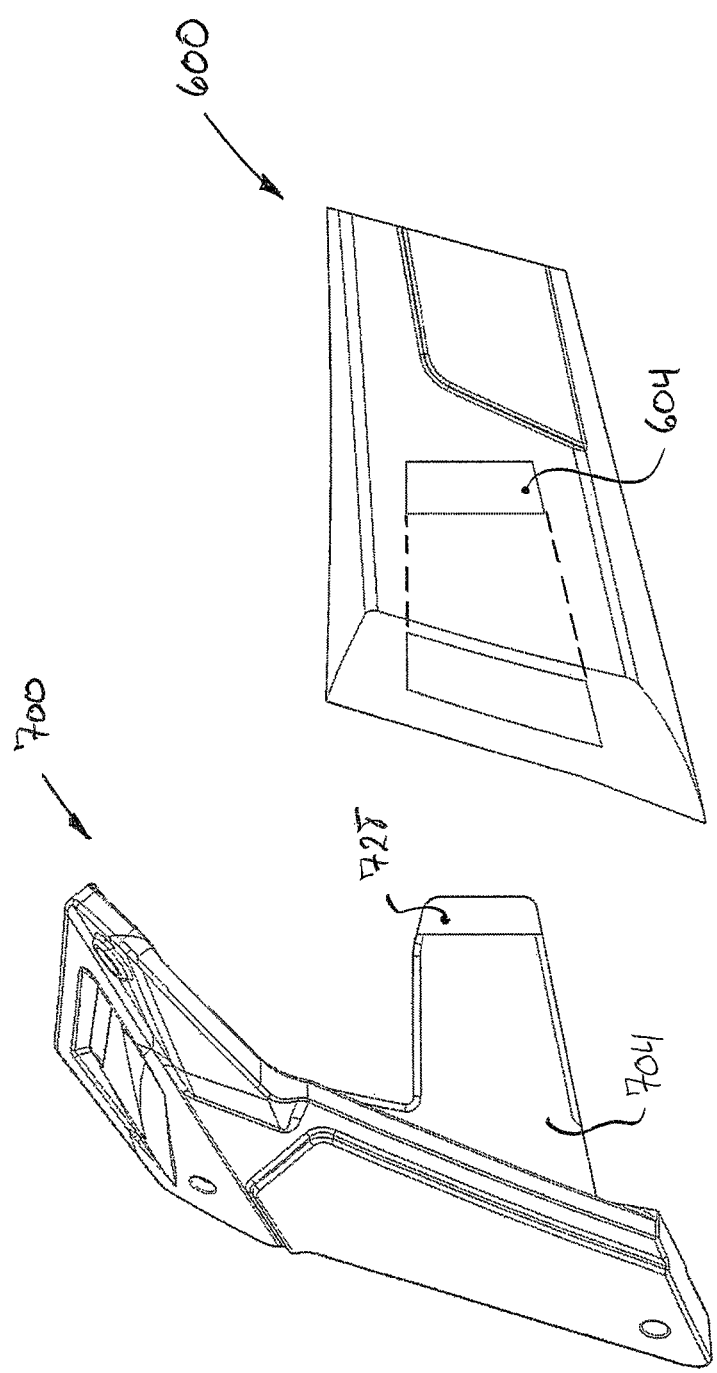
FIG. 12 is a side view of the windshield mounting system of FIG. 11.
Figure 13:
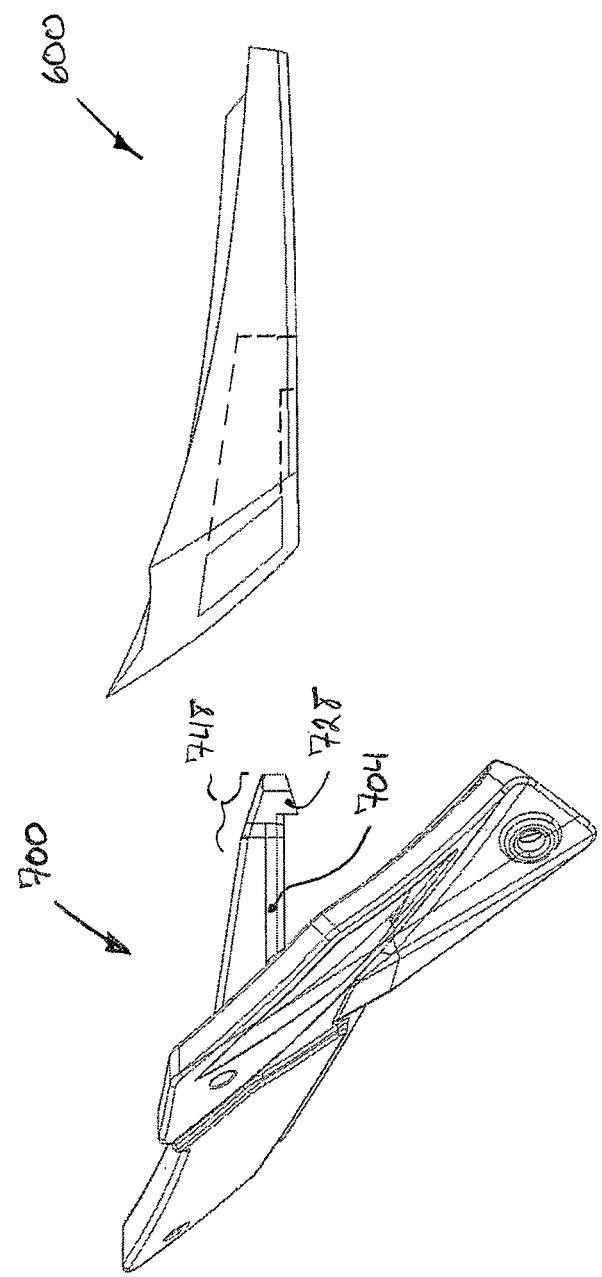
FIG. 13 is a top view of the windshield mounting system of FIG. 11.

In other embodiments, the mounting member could comprise a single arm wherein the arm would act as both a guide arm and a locking arm. Referring to FIGS. 11 to 13, an embodiment of the windshield mounting system 550 in which the mounting member 700 comprises only one arm 704 is shown.

In this embodiment, the receiving member 600 is configured similarly to receiving member 100. In that sense, the receiving member 600, which is configured to be located at the front of the vehicle 40, comprises a main body 620 comprising a receiving cavity 622 and a locking opening 604. Notably, as best shown in FIG. 11, the locking opening 604 is located on the exterior wall portion 646 of the main body 620.

For its part, the mounting member 700 also comprises an attachment base portion 726 configured to be mounted to, or be integral with, the windshield panel 30, and a connecting portion 740. However, as indicated above, in this embodiment, the connecting portion comprises only a locking arm 704 which also acts as a guide arm. As shown in FIG. 11, the locking arm 704 comprises a locking projection 728.

In this embodiment, to allow the portion 748 of the locking arm 704 supporting the locking projection 728 to deflect during installation and removal of the windshield panel 30, the portion 748 is made thinner than the rest of the locking arm 704 to provide the flexibility required for the portion 748 to deflect during the insertion of the locking arm 704 into the receiving cavity 722.

Although the present embodiments described herein have a generally horizontal orientation, systems having a generally vertical orientation could also be envisioned.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A windshield mounting system for mounting a windshield panel to a vehicle, the windshield mounting system comprising:
    a) a receiving member configured to be located on the vehicle, the receiving member comprising an internal receiving cavity having a receiving opening and a locking opening;
    b) a mounting member configured to be located on the windshield panel, the mounting member comprising a base portion and a connecting portion extending from the base portion, the connecting portion comprising a resiliently displaceable locking arm configured to be received into the receiving cavity, the locking arm comprising a locking projection configured to releasably engage the locking opening when the locking arm is received into the receiving cavity, wherein the receiving member is configured to be located on a lighting pod of the vehicle.

2. A windshield mounting system as claimed in claim 1, wherein the locking projection is located at an extremity of the locking arm.

3. A windshield mounting system as claimed in claim 1, wherein the connecting portion further comprises a guide arm configured to be received into the receiving cavity.

4. A windshield mounting system as claimed in claim 3, wherein the locking arm is spaced from the guide arm.

5. A windshield mounting system as claimed in claim 1, wherein the locking opening is a first locking opening, wherein the locking arm is a first locking arm, wherein the locking projection is a first locking projection, and wherein the receiving member comprises a second locking opening, wherein the connecting portion comprises a second resiliently displaceable locking arm configured to be received into the receiving cavity, and wherein the second locking arm comprises a second locking projection configured to releasably engage the second locking opening when the second locking arm is received into the receiving cavity.

6. A windshield mounting system as claimed in claim 3, wherein the locking opening is a first locking opening, wherein the locking arm is a first locking arm, wherein the locking projection is a first locking projection, and wherein the receiving member comprises a second locking opening, wherein the connecting portion comprises a second resiliently displaceable locking arm configured to be received into the receiving cavity, and wherein the second locking arm comprises a second locking projection configured to releasably engage the second locking opening when the second locking arm is received into the receiving cavity.

7. A windshield mounting system as claimed in claim 6, wherein the first and second locking arms are spaced from the guide arm.

8. A windshield mounting system as claimed in claim 1, wherein the receiving member comprises an outer wall portion, a first side wall portion, and a second side wall portion, and wherein the locking opening is substantially located in one of the first and second side wall portions.

9. A windshield mounting system as claimed in claim 8, wherein the first side wall portion is a substantially upper wall portion, and wherein the second side wall portion is a substantially lower wall portion.

10. A windshield mounting system as claimed in claim 1, wherein the receiving member comprises an outer wall portion, a first side wall portion, and a second side wall portion, and wherein the locking opening is substantially located in the outer wall portion.

11. A windshield mounting system as claimed in claim 1, wherein the receiving opening is configured to face in a forward direction of the vehicle when the receiving member is located on the vehicle.

12. A windshield mounting system as claimed in claim 1, wherein the receiving member is integral with the lighting pod of the vehicle.

13. A windshield mounting system for mounting a windshield panel to a vehicle, the windshield mounting system comprising:
   a) a first receiving member configured to be located on the vehicle, the first receiving member comprising a first internal receiving cavity having a first receiving opening and a first locking opening;
   b) a second receiving member configured to be located on the vehicle, the second receiving member comprising a second internal receiving cavity having a second receiving opening and a second locking opening;
   c) a first mounting member configured to be located on the windshield panel, the first mounting member comprising a first base portion and a first connecting portion extending from the first base portion, the first connecting portion comprising a first resiliently displaceable locking arm configured to be received into the first receiving cavity, the first locking arm comprising a first locking projection configured to releasably engage the first locking opening when the first locking arm is received into the first receiving cavity; and
   d) a second mounting member configured to be located on the windshield panel, the second mounting member comprising a second base portion and a second connecting portion extending from the second base portion, the second connecting portion comprising a second resiliently displaceable locking arm configured to be received into the second receiving cavity, the second locking arm comprising a second locking projection configured to releasably engage the second locking opening when the second locking arm is received into the second receiving cavity;
      wherein the first locking projection is located at an extremity of the first locking arm, and wherein the second locking projection is located at an extremity of the second locking arm.

14. A windshield mounting system as claimed in claim 13, wherein the first connecting portion further comprises a first guide arm configured to be received into the first receiving cavity, and wherein the second connecting portion further comprises a second guide arm configured to be received into the second receiving cavity.

15. A windshield mounting system as claimed in claim 14, wherein the first locking arm is spaced from the first guide arm, and wherein the second locking arm is spaced from the second guide arm.

16. A windshield mounting system as claimed in claim 13, wherein the first receiving member comprises a third locking opening, wherein the first connecting portion comprises a third resiliently displaceable locking arm configured to be received into the first receiving cavity, and wherein the third locking arm comprises a third locking projection configured to releasably engage the third locking opening when the third locking arm is received into the first receiving cavity, and wherein the second receiving member comprises a fourth locking opening, wherein the second connecting portion comprises a fourth resiliently displaceable locking arm configured to be received into the second receiving cavity, and wherein the fourth locking arm comprises a fourth locking projection configured to releasably engage the fourth locking opening when the fourth locking arm is received into the second receiving cavity.

17. A windshield mounting system as claimed in claim 14, wherein the first receiving member comprises a third locking opening, wherein the first connecting portion comprises a third resiliently displaceable locking arm configured to be received into the first receiving cavity, and wherein the third locking arm comprises a third locking projection configured to releasably engage the third locking opening when the third locking arm is received into the first receiving cavity, and wherein the second receiving member comprises a fourth locking opening, wherein the second connecting portion comprises a fourth resiliently displaceable locking arm configured to be received into the second receiving cavity, and wherein the fourth locking arm comprises a fourth locking projection configured to releasably engage the fourth locking opening when the fourth locking arm is received into the second receiving cavity.

18. A windshield mounting system as claimed in claim 17, wherein the first and third locking arms are spaced from the first guide arm, and wherein the second and fourth locking arms are spaced from the second guide arm.

19. A windshield mounting system as claimed in claim 13, wherein the first receiving member comprises a first outer wall portion, a first side wall portion, and a second side wall portion, wherein the first locking opening is substantially located in one of the first and second side wall portions, and wherein the second receiving member comprises a second outer wall portion, a third side wall portion, and a fourth side wall portion, wherein the second locking opening is substantially located in one of the third and fourth side wall portions.

20. A windshield mounting system as claimed in claim 19, wherein the first side wall portion is a first substantially upper wall portion, wherein the second side wall portion is a first substantially lower wall portion, wherein the third side wall portion is a second substantially upper wall portion, wherein the fourth side wall portion is a second substantially lower wall portion.

21. A windshield mounting system as claimed in claim 13, wherein the first receiving member comprises a first outer wall portion, a first side wall portion, and a second side wall portion, wherein the first locking opening is substantially located in the first outer wall portion, and wherein the second receiving member comprises a second outer wall portion, a third side wall portion, and a fourth side wall portion, wherein the second locking opening is substantially located in the second outer wall portion.

22. A windshield mounting system as claimed in claim 13, wherein the first and second receiving openings are configured to face in a forward direction of the vehicle when the first and second receiving members are located on the vehicle.

23. A windshield mounting system as claimed in claim 13, wherein the first and second receiving members are configured to be located on a lighting pod of the vehicle.

24. A windshield mounting system as claimed in claim 23, wherein the first and second receiving members are integral with the lighting pod of the vehicle.

25. A method to install a windshield panel comprising a mounting member as claimed in claim 1, onto a vehicle comprising a receiving member as claimed in claim 1, the method comprising:
   a) inserting the locking arm of the mounting member into the receiving cavity of the receiving member until the locking projection engages the locking opening.

26. A method to install a windshield panel comprising first and second mounting members as claimed in claim 13, onto a vehicle comprising first and second receiving members as claimed in claim 13, the method comprising:
   a) inserting the first locking arm into the first receiving cavity of the first receiving member and the second locking arm into the second receiving cavity of the second receiving member until the first locking projection engages the first locking opening and the second locking projection engages the second locking opening.

27. A windshield mounting system as claimed in claim 1, wherein the mounting member is configured to be located on the vehicle and wherein the receiving member configured to be located on the windshield panel.

28. A windshield mounting system as claimed in claim 13, wherein the first and second mounting members are configured to be located on the vehicle and wherein the first and second receiving members are configured to be located on the windshield panel.

\* \* \* \* \*